Figure 1:
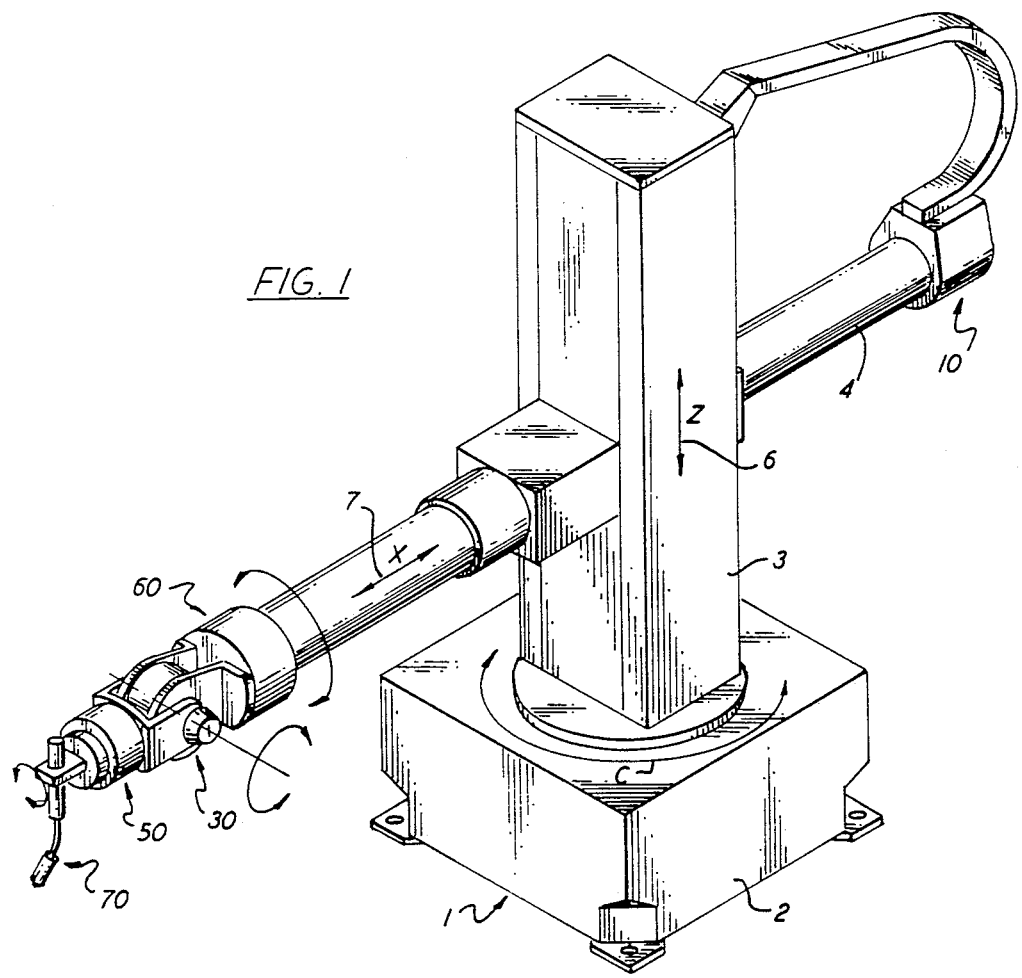

United States Patent [19]

Schaib et al.

[11] Patent Number: 4,489,624
[45] Date of Patent: Dec. 25, 1984

[54] TRIAXIAL HINGE FOR ROBOTS, HANDLING APPARATUS AND THE LIKE

[75] Inventors: Albert Schaib, Ettishofen; Horst Manogg, Überlingen; Adolf Hörl, Friedrichsafen, all of Fed. Rep. of Germany

[73] Assignee: Zahnradfabrik Friedrichshafen AG, Fed. Rep. of Germany

[21] Appl. No.: 362,646

[22] Filed: Mar. 29, 1982

[30] Foreign Application Priority Data

Apr. 1, 1981 [DE] Fed. Rep. of Germany ....... 3113184

[51] Int. Cl.³ .............................................. B25J 3/04
[52] U.S. Cl. ..................................... 74/479; 74/469; 91/508; 414/4; 414/735; 901/22
[58] Field of Search ...... 74/469, 479; 414/1, 414/4, 735; 91/508; 901/22, 37

[56] References Cited

U.S. PATENT DOCUMENTS

| | | |
|---|---|---|
| 3,667,580 | 6/1972 | Schacher et al. |
| 3,819,061 | 6/1974 | Andersson et al. |
| 3,888,362 | 6/1975 | Fletcher |
| 3,904,042 | 9/1975 | Colston ................................ 414/1 |
| 4,068,536 | 1/1978 | Stackhouse |

FOREIGN PATENT DOCUMENTS

| | | |
|---|---|---|
| 1922644 | 11/1970 | Fed. Rep. of Germany |
| 1930295 | 12/1970 | Fed. Rep. of Germany |
| 2146289 | 3/1973 | Fed. Rep. of Germany |
| 2301423 | 7/1974 | Fed. Rep. of Germany |
| 2503003 | 8/1975 | Fed. Rep. of Germany |
| 2745932 | 6/1978 | Fed. Rep. of Germany |
| 2717870 | 10/1978 | Fed. Rep. of Germany |
| 2754609 | 6/1979 | Fed. Rep. of Germany ......... 414/4 |
| 2927485 | 1/1981 | Fed. Rep. of Germany |
| 1385415 | 2/1975 | United Kingdom |

OTHER PUBLICATIONS

ZF-Hypomatic, Hydraulic Brake & Drive Unit for Braking, Positioning & Indexing, F 14409.
Kuka, Handhabungs Technik, IR 601/60 CP, mit kimfortabler Bahnsteuerung.

*Primary Examiner*—Allan D. Herrmann
*Attorney, Agent, or Firm*—Hayes, Davis & Soloway

[57] ABSTRACT

A triaxial hinge for robots, mechanical handling apparatus and the like comprising three different kinematic elements, namely, a first, a second and a third element, of which the first element on the arm of the handling apparatus or robot is rotatably secured around a first axis while the kinematic elements that follow are substantially disposed in continuation of the respective preceding element and each having a rotation axis, wherein each one of the kinematic elements has on its outer end a receiving flange to which is secured the kinematic element that follows, and said three kinematic elements can be hydraulically driven separately or independently of each other.

5 Claims, 5 Drawing Figures

TRIAXIAL HINGE FOR ROBOTS, HANDLING APPARATUS AND THE LIKE

The invention concerns itself with a triaxial hinge (or joint) for robots, handling apparatus and the like.

Such a hinge having three elements and three axes has been disclosed, for instance, in German Published Application No. 27 17 870. In this hinge the first element is a frame that rotates about its longitudinal axis to which frame are secured the driving motors and an angle-measuring systems, and a second element is rotated by motors by means of toothed belts and sprocket wheels. The second and third elements, the axes of which are perpendicular to the first element, each have complexly mounted shafts, the rotation being transmitted from the second to the third element by means of bevel gears. This triaxial hinge already known is of relatively complex construction with many details; in such an apparatus the interaction of the three axes must be compensated. Besides, in such a hinge having axes that stand perpendicular on top of each other the pre-calculation of the path lines in an apparatus with path control is relatively complicated.

Other triaxial hinges have been disclosed in German published application No. 27 45 932 and in German laid-open application No. 29 27 485. In these hinges already known the three driving axes are disposed concentrically one on top of the other, the outer axis, as first element, being shaped in its outer end as a half shell. The second element, which is likewise shaped as a half shell, is rotatably mounted on the first half shell and via conical sprocket wheels receives its rotation from the central concentric driving shaft, while the third element eccentrically situated in the second element likewise receives its rotation via several conical sprocket wheels from the inner one of the three concentric driving shafts. But in these triaxial hinges the axes of the three kinematic elements are in such angular position relative to each other that they meet in a common point of intersection. This simplifies the pre-calculation of path lines. But relatively too many additional mechanical elements have to be used here and the interaction of the three axes is also present and must be compensated. In all these known triaxial hinges the entire hinge must always be used with its three parts or three axes. It is not possible, when needed, to use as desired only one, or two, or three elements, which often causes an excessive complexity where it is not necessary.

The problem on which the invention is based is to provide a triaxial hinge for robots, handling apparatus, or the like that is suitable for any handling apparatus with tubular operating arm and that ensures a great precision of the operation without there taking place any interaction of the three axes that has to be compensated. At the same time the axes must be directly and individually controlled and easily programmed. There is also avoided between the axes, at a minimal building cost, a misalignment of the axes, and a precise mode of operation is obtained. The triaxial hinge is simply and compactly constructed, it is easy to maintain and to repair and allows the axes to be used separately or in any desired combination.

According to the invention there is provided a triaxial hinge for robots, mechanical handling apparatus and the like comprising three different kinematic elements, namely, a first, a second and a third element, of which the first element on the arm of the handling apparatus or robot is rotatably secured around a first axis while the kinematic elements that follow are substantially disposed in continuation of the respective preceding element and each having a rotation axis, wherein each one of the kinematic elements has on its outer end a receiving flange to which is secured the kinematic element that follows, and said three kinematic elements can be hydraulically driven separately or independently of each other.

Accordingly, the triaxial hinge of the invention has in a manner known per se three kinematic elements essentially disposed one behind the other, each element having a center of rotation, each of the three kinematic elements being separately driven hydraulically according to the invention, and each one of the kinematic elements having at its outer end a receiving flange to which is secured the kinematic element that follows. It is thus obtained that each one of the three different kinematic elements be able to receive or effect its rotation practically independently of the preceding element, whereby is obtained an autonomy of the kinematic elements. In this manner it is made possible that the elements be also used separately or in any desired combination, taken in pairs or also changed in location. By means of the separately effected hydraulic drive of one axis, the interaction of the three axes is eliminated and consequently compensation is no longer needed. By the direct ability of the kinematic elements to be flanged to each other, an easier and simpler exchange of an element is possible.

Here it is advantageous in the first embodiment that the hydromotor of the first element be directly secured to the forward end of the operating arm and that the first receiving flange be secured to the driving rotor of the first hydromotor. Hereby all three kinematic elements are disposed in the forward side of the operating arm so that the structural parts to be moved by them can be made light and short.

According to another embodiment of the invention, it is specially advantageous to secure the hydromotor of the first element to the rear end of the arm, while in the interior of the tubular arm a driving duct is coaxially disposed. This driving duct is on one side secured to the driving rotor of the first hydromotor and on the other it has a receiving flange by means of which it is at the same time mounted in the manipulating arm. Here a first synchro drive is secured on a receiver and driven with the hydromotor, free of play, by means of a toothed belt.

The second kinematic element is constructed according to another embodiment of the invention so as to have two substantially parallel carrier supports secured to the preceding element, said carrier supports receiving therebetween a second hydromotor. The receiving flange of the second element has here two substantialy parallel rockers that embrace the carrier supports in a manner such that one rocker is connected with the driver rotor of the second hydromotor, while the second rocker is rotatably mounted on the second carrier support. The second synchro drive is disposed in the large bore of the second hydromotor so as to be coupled on one side with a rocker and on the other with the second carrier support. It is thus that the second axis of rotation extends substantially perpendicularly to the first axis of rotation and intersecting it.

The third kinematic element is advantageously constructed according to a further development of the idea of the invention in a manner such that its hydromotor is directly superimposed on the receivng flange of the second kinematic element, the third receiving flange of the third hydromotor being screwed on. At the same time a third synchro drive is inserted in the large bore of the hydromotor so as to be coupled free of play on the one side with the third receiving flange and on the other with the second receiving flange. According as it may be needed, gripping means or tools are secured to the third receiving flange whereby the bearing of the hydromotor is simultaneously used as bearing for carrying said implements. The axis of rotation of this third element is likewise perpendicular to the preceding element and in a manner such that all three axes meet at the same point of intersection. This is extremely important for instruments having path control as the expense for precalculating path curves and programming are simplified.

To obtain a compact construction, there is disposed between the first and second kinematic elements a solid intermediate element in which are situated the servovalves for elements two and three. Besides, this intermediate element receives the hydraulic control block for accommodating the servovalves and the hydraulic lines for the elements that follow, the same as the electric control lines that are overlaid on a terminal strip and are extended from there into a collecting line. After removing a shield tube that constitutes the outer sheathing of the intermediate element, the servovalves and terminal strips are easily accessible, which further increases the ease in the maintenance and repair of the triaxial hinge according to the invention. The hydraulic lines and the electric control lines are also predominantly situated in the interior of the kinematic elements, which also substantially contributes to the compact construction that is only slightly susceptible to obstructions.

In another embodiment specially suited to automation, there can be used for the kinematic elements hydraulic positioning devices known per se (see German Pat. No. 21 46 289) which corresponds to U.K. Pat. No. 1,385,415. See U.S. Pat. No. 3,667,580. Here the respective positioning device comprises a hydrostate (preferably a vane pump) that drives an indexing disc correspondingly provided with positioning notches (or index plates) and a control unit the fixing bolts of which respectively mesh in one of the positioning notches of the disc. If one of the kinematic elements is now rocked, the corresponding fixing bolt of the control unit is removed from the positioning notch and the vane pump starts rotating at the speed set. After obtaining the desired angle of horizontal swing, the fixing bolt moves in a corresponding notch of the control disc whereby the kinematic element is again arrested.

The use of hydraulic drives has the added advantage that lubricated gearing members are always used, that is, practically no additional lubrication of the movable parts is needed. Besides, gripping forces can be hydraulically transmitted without additional parts or friction points and eventually necessary cooling is possible outside the kinematic element.

Figure 2:
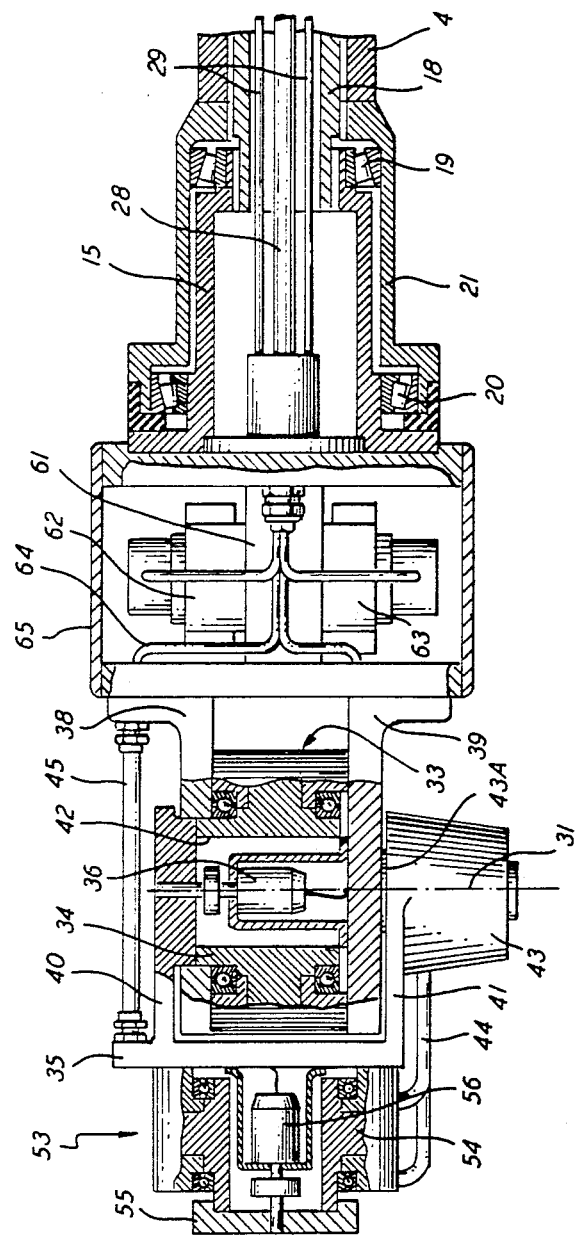
Figure 2A:
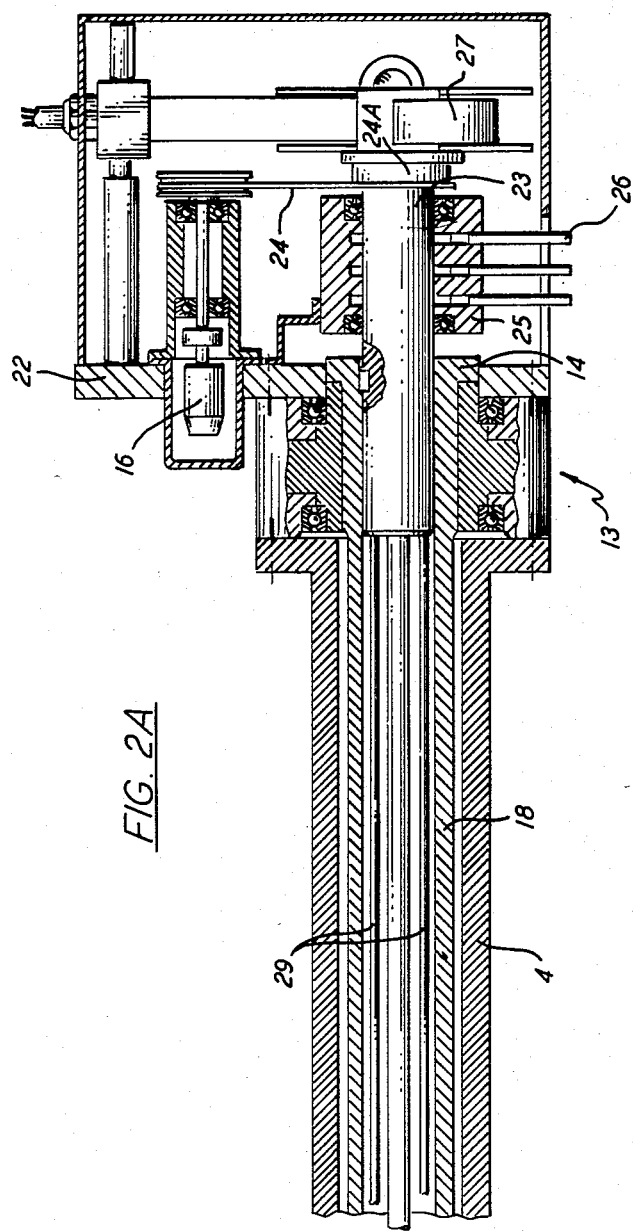
Figure 3:
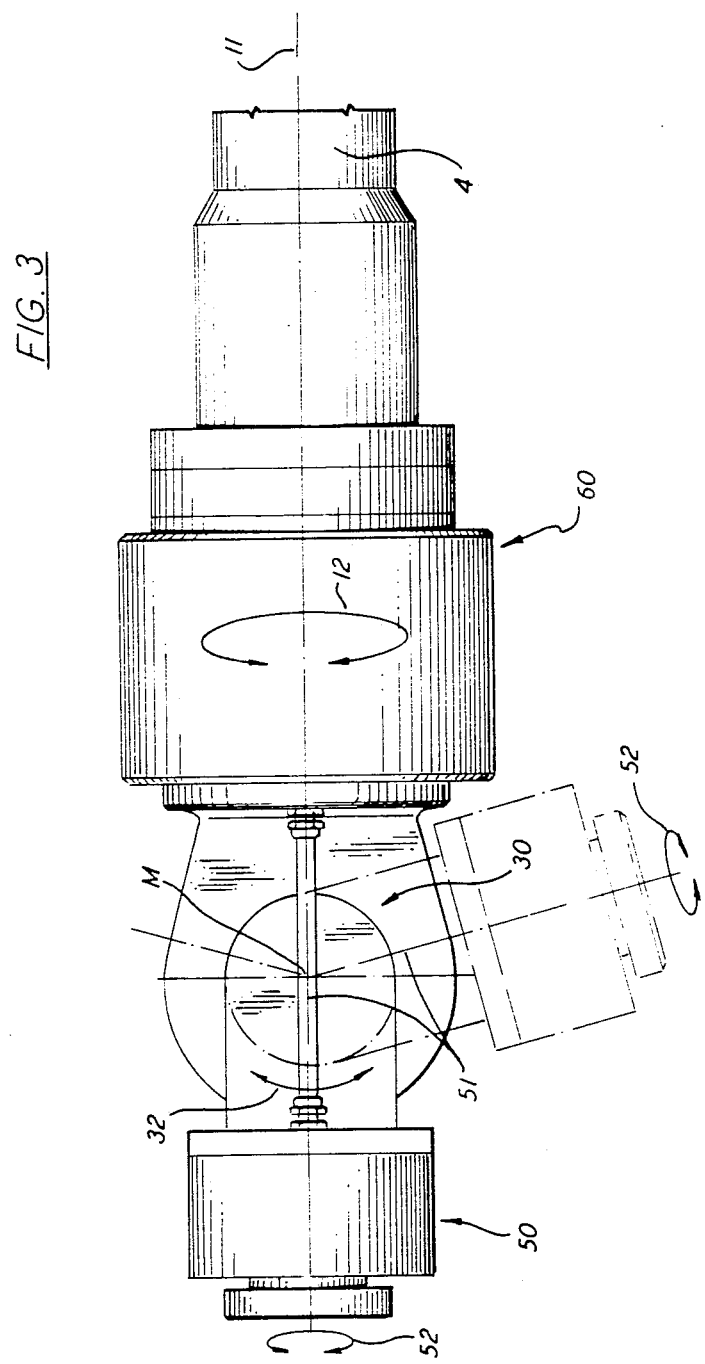
Figure 3A:
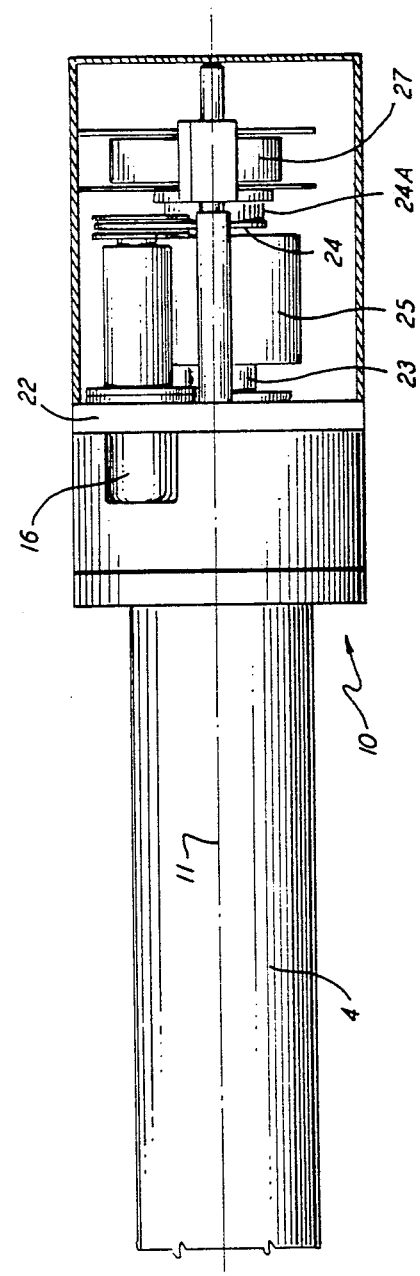

The invention will now be described, by way of example, with reference to the accompanyng drawings, in which:

FIG. 1 is a perspective view on a handling apparatus having a triaxial hinge according to the invention, FIGS. 2 and 2A together are an axial section through the triaxial hinge that shows in coaxial alignment the first and second axes, FIGS. 3 and 3A together are a top view of the triaxial hinge as shown in FIG. 2.

As it can be seen in FIG. 1, the handling apparatus 1 comprises a base 2 in the upper side of which is provided a vertical tower 3 that can effect a rotation 5 about the vertical Z-axis. On the tower 3 is provided a horizontal arm 4 in a manner such that it can effect on one side a vertical translation 6 and on the other a horizontal translation 7 along the X-axis. At the rear end of the arm 4 there can be seen in FIG. 1 a portion of a first kinematic element 10 that extends in part coaxially in the interior of the arm 4 until the forward side thereof, as it can be more precisely seen in FIG. 2. At the forward end of the arm 4 there are additionally situated a second kinematic element 30, a third kinematic element 50 and thereon a tool 70.

It can be seen in FIG. 2 that to the here right side of the arm 4 of the handling apparatus 1 there is secured a first hydromotor 13 in the driving rotor 14 of which is secured a driving duct 18 that runs coaxially through the arm 4. The driving duct 18 has on its left end, and secured thereto by screwing or the like, a receiving flange 15 that for its part is mounted over bearings 19 and 20 in a bearing duct 21 secured to the arm 4. Hereby the driving duct 18 and thus the first kinematic element 10 are precisely and free of play mounted on one side over the hydromotor and on the other at the outer end of the manipulating arm 4. On the forward side of the hydromotor 13 is secured a receiver 22 that accommodates a synchro drive 16. The synchro drive 16 is on one side connected with the receiver 22 and on the other is driven free of play with the driving rotor 14 of the hydromotor 13 by means of a toothed belt 24 driven by a pulley 24A from a shaft 23 and the driving duct 18 firmly connected with the shaft 23. On the shaft 23 is additionally provided an oil distributor 25 with hydraulic energy supply line 26 and also a rotary supply line 27 for the electric control lines. The electric control lines 28 and the hydraulic lines 29 are laid in the interior of the driving duct 18. To the receiving flange 15 of the first kinematic element 10 is secured an intermediate element 60 that essentially comprises a valve carrier 61 that simultaneously serves as a hydraulic block for receiving servovalves 62, 63 for the kinematic elements 30 and 50 and for leading the hydraulic lines to their motors, which is not shown. Besides, the electric control lines 64 are here overlaid on a terminal strip and from there passed into a collecting line 45 at the rear portion of the second element 50. The valve carrier 61 is surrounded by a cylindrical shield line that is made easily removable for better maintenance of the parts situated in the interior. On the left flange-like end of the intermediate element 60 the second kinematic element 30 is secured by L-shaped support carriers 38, 39. Between the substantially parallel arms of the support carriers 38, 39 is accommodated a hydromotor in a manner such that the driving rotor 36 thereof extends into a corresponding recess of the support carrier 38. The element 30 has in addition a receiving flange 35 that has two rockers 40, 41 perpendicular thereto and aligned substantially parallel with each other that encompass the support carriers 38 and 39 for rotation about axis 31. At the same time the rocker 40 is connected with torsional strength to the driving rotor (shaft) 34 of the hydromotor 33, while the rocker 41 is rotatably mounted by stub shaft 43A to the arm of the support carrier 39. Hereby is effected the swiveling of the receiving flange around the axis of the hydromotor that constitutes at the same time the rotation axis 31 of the second kinematic element 30. The axis 31 is aligned substantially perpendicularly to the rotation axis 11 of the first kinematic element 10. In the large bore 42 of the hydromotor 33 a synchro drive 36 is disposed so as to be connected free of play on one side with the rocker 40 and on the other with the support carrier 39. The rocker 41 is constructed so as to accommodate an oil distributor 43 starting from which pipeworks 44 lead to the third kinematic element 50. In the support carriers 38, 39 there are provided bores (not shown) through which the hydraulic and electric lines are led from the intermediate element 60 into the second kinematic element 30. The third kinematic element 50 essentially comprises a hydromotor 53 that is directly screwed on the receiving flange 35 on the second kinematic element 30. On the driving rotor 54 of the hydromotor 53 is secured a receiving flange 35 that for its part serves for accommodating gripping devices or tools 70. In the large bore of the hydromotor 53 is disposed a synchro drive 56 in a manner such as to be connected free of play on one side with the receiving flange 55 and on the other with the receiving flange 35. The axis 51 of the hydromotor 53 also forms here at the same time the rotation axis of this kinematic element, being aligned so as to stand substantially perpendicularly to the axis 31 of the second element, which axis it cuts. The rotation axes 11, 31, 51 of the three kinematic elements 10, 30 and 50 are consequently aligned so as to intersect each other at one point M that is on the axis 31.

The triaxial hinge according to the invention can be conceived in relation not only with a handling apparatus of the heavy kind shown in the drawing but also with other basic apparatus like robots or movable basic apparatus such as a tower set on a truck and others.

A synchro drive is a potentiometer responsive to rotational movement.

We claim:

1. A triaxial hinge for mechanical handling apparatus comprising first, second and third kinematic elements connected in series to provide, rotation about three axes intersecting at a single point, which three axes, in at least one operational position, are mutually perpendicular, each said element, when in said operating position, providing for said rotation about a different one of said axes, said first element having a first hydromotor with a rotary output means directly supporting said second element and providing rotation of said second element about first of said axes, said second element having parallel support carriers fixed to said first element and carrying a second hydromotor and being embraced by parallel rocker arms, said second hydromotor having rotary output means directly supporting said third element by means of said rocker arms, said support carriers and rocker arms being pivotally interconnected to enable the rotary output means of said second hydromotor to provide rotation of said third element about a second of said three axes, said third element supporting a third hydromotor having a rotary output means to provide rotation about a third of said three axes, said hydromotors being independently operable, their operation being coordinated by first, second and third synchro-drives mounted respectively to said first, second and third elements to detect and measure rotation of the respective hydromotor rotary output means, said synchro-drive of said second element being disposed within said second hydromotor of said second element for direct operation by said rotary output means of said second hydromotor, said synchro-drive of said third element being disposed within said third hydromotor of said third element for rotation by the rotary output of said third hydromotor.

2. A triaxial hinge according to claim 1, wherein said rockers are rigidly interconnected with a receiving flange of said third element to which said third hydromotor is fixedly attached.

3. A triaxial hinge according to claim 1, wherein said first element has a forward end connected to said second element and a rearward end, said first hydromotor being secured adjacent said rearward end of said first element with said rotary output means of said first hydromotor extending through said first element to provide said rotation about said first axis, said synchro-drive of said first element being driven by a belt from said rotary output of the first hydromotor.

4. A triaxial hinge according to claim 1, wherein between said first and said second elements is situated an intermediate element having servo valves adapted for the operation of said second and third elements.

5. A triaxial hinge according to claim 1, wherein hydraulic lines and electrical control lines are disposed predominantly within the interior of said elements.

* * * * *